United States Patent [19]

Hashimoto et al.

[11] Patent Number: 4,479,879
[45] Date of Patent: Oct. 30, 1984

[54] PROCESS FOR DEWATERING SLUDGES

[75] Inventors: Masanori Hashimoto, Yamato; Masaaki Wakita, Ebina, both of Japan

[73] Assignee: Kurita Water Industries Ltd., Osaka, Japan

[21] Appl. No.: 484,089

[22] Filed: Apr. 11, 1983

[30] Foreign Application Priority Data

Apr. 22, 1982 [JP] Japan .................................. 57-67619

[51] Int. Cl.$^3$ ............................................. C02F 11/14
[52] U.S. Cl. ................................... 210/727; 210/734; 210/735; 210/738
[58] Field of Search ............... 210/609, 725, 727, 728, 210/732-735, 738

[56] References Cited

U.S. PATENT DOCUMENTS

| | | | |
|---|---|---|---|
| 3,259,570 | 7/1966 | Priesing et al. | 210/735 |
| 3,377,274 | 4/1968 | Burke et al. | 210/727 |
| 3,397,139 | 8/1968 | Sak | 210/727 |
| 3,617,568 | 11/1971 | Ries | 210/727 |
| 3,826,787 | 7/1974 | Capozza | 210/735 |
| 3,835,046 | 9/1974 | Restaino | 210/734 |
| 4,007,200 | 2/1977 | Panzer et al. | 210/734 |
| 4,382,864 | 5/1983 | Hashimoto et al. | 210/727 |

Primary Examiner—Peter Hruskoci
Attorney, Agent, or Firm—Flynn, Thiel, Boutell & Tanis

[57] ABSTRACT

A process for dewatering aqueous sludges of organic nature by adding to the sludge a cationic organic flocculant to effect a first stage agitation of vigorous intensity, and then adding thereto an anionic organic flocculant to perform a second stage agitation of mild intensity and subjecting the thus formed flocs to a dewatering operation, which process comprises the use of a cationic organic flocculant composed of any combination of A- and B-components, wherein the A-component consists of one or more polymers selected from the group consisting of $A_1$- and $A_2$-components, in which the $A_1$-component consists of polymers having a structural unit of vinylimidazoline or partially hydrolyzed products thereof and the $A_2$-component consists of Hofmann-degradation products of polymers having a structural unit of acrylamide or methacrylamide, and the B-component consists of one or more polymers selected from the group consisting of synthetic water-soluble cationic polymers other than the polymers of the A-component.

6 Claims, No Drawings

PROCESS FOR DEWATERING SLUDGES

BACKGROUND OF THE INVENTION

1. Field of the Invention

The present invention relates to a process for dewatering aqueous sludges of organic nature by adding thereto flocculants.

2. Description of the Prior Art

There had been proposed a process for dewatering aqueous sludges of organic nature, such as sludges from sewage treatment, biological treatment of night soil and so on, in which a cationic organic flocculant is first added to the sludge with agitation and thereto is then added an anionic organic flocculant with agitation to effect flocculation, so as thereafter to subject the formed flocs to dewatering operation. If ordinary synthetic organic flocculants are employed in this process as the cationic and anionic flocculants, the tolerable ranges for the dosages of such flocculants and for the dosage ratio between these flocculants will be considerably restricted, so that accommodation in the practical operation to the widely fluctuating actual conditions, such as the concentration, nature and properties of the sludge etc., is difficult. Moreover, this prior process exhibited a further shortcoming in that, though the flocs formed are large and stout, they are sticky and the moisture content of the dewatered sludge cake is higher as compared with that of the cake obtained by the sole addition of a cationic or anionic flocculant, resulting in a decrease of the filtration velocity.

In order to remedy these difficulties, an improved process was proposed in which for either one of the cationic and anionic flocculants a natural organic polymer derivative is used. Though this process was excellent insofar as it brought forth improvements of the difficulties mentioned above, there was some fear for the stable supply of the raw material for the natural organic polymer derivative. In particular, while it is attainable to lower the moisture content of the dewatered sludge cake by a drastic degree by employing a natural organic polymer derivative, especially chitosan, for the cationic organic flocculant, there is no satisfactory assurance of the stable supply of the raw material therefor, since chitosan is obtained from crab exoskeleton.

Attempts have been made to replace such natural occurring organic flocculant by a synthetic polymer offering a comparable dewatering performance, and there was proposed a process in which a polymer having a constituent unit of imidazoline was employed. However, it has been expected that a synthetic polymer realizing a more effective dewatering performance will be found.

BRIEF SUMMARY OF THE INVENTION

The object of the present invention is to provide a process for dewatering aqueous sludges which enables an excellent dewatering performance by the employment of a synthetic polymer.

Another object of the present invention is to provide a process for dewatering sludges which lowers the tenacity of the sludge by performing the neutralization of the electric charge of the sludge in a pertinent manner.

Another object of the present invention is to provide a process for dewatering sludges permitting an increased treatment rate by increasing the dewaterability of the sludge upon filtration thereof.

A further object of the present invention is to provide a process for dewatering sludges which obtains a dewatered cake having low moisture content.

A still further object of the present invention is to provide a process for dewatering sludges which exhibits a wide tolerable range of the dosage ratio of the cationic organic flocculant to the anionic organic flocculant with easier regulation of the dosages therefor.

Other objects of the present invention will become evident from the descriptions set forth below.

The present invention may be summarized as follows:

A process for dewatering aqueous sludges of organic nature by adding to the sludge a cationic organic flocculant to effect a first stage agitation and adding subsequently thereto an anionic organic flocculant to perform a second stage agitation and subjecting the thus formed flocs to a dewatering operation, which process comprises the use of a cationic organic flocculant composed of any combination of the following A-component with the following B-component:

A-component: One or more polymers selected from the group consisting of the following $A_1$- and $A_2$-components:

$A_1$-component: Polymers having vinylimidazoline as a structural unit or partially hydrolyzed products thereof $A_2$-component: Hofmann-degradation products of polymers having acrylamide or methacrylamide as a structural unit B-component: One or more polymers selected from synthetic water-soluble cationic polymers other than the polymers of A-component The first stage agitation should preferably be such as intense one that no floc having a size greater than 2 mm will be formed.

DETAILED DESCRIPTION OF THE INVENTION

The aqueous sludges of organic nature to be treated by the process according to the present invention include, for example, excess activated sludges from activated sludge treatments of sewage, supernatant of digested night soil and other polluted waste waters, such as those produced by a food industry, paper and pulp factory, paper mill, pharmaceutical plant and so on, sludge from the primary settling tank of sewage, coagulated sludges occurring in the tertiary treatment of night soil and sewage, anaerobically and aerobically digested sludges of sewage and night soil and so on. These sludges may be treated separately or in mixture.

In the process according to the present invention, a cationic organic flocculant is first admixed to the aqueous organic sludge. This cationic organic flocculant is a combination of the A- and B-components defined previously. Here, the combination of the A- and B-components can be added in a form of a mixture or separately of each other in a chosen sequence to the sludge.

A-component: This performs as a cationic organic flocculant and consists of one or more of synthetic polymers of $A_1$- and $A_2$-components $A_1$-component: This consists of polymers each having vinylimidazoline as a structural unit or partially hydrolyzed products thereof.

The polymers of the $A_1$-component may have other structural units than vinylimidazoline, such as vinylpyrimidine, acrylamide, acrylate esters, vinyl acetate and so on, in an amount at the highest of 50 mole %. Examples of such polymers include polyvinylimidazoline and copolymers of vinylimidazoline with vinylpyrimidine and/or other monomers. These polymers and the partially hydrolyzed products thereof may preferably have intrinsic viscosities $[\eta]_{0.1N\text{-}NaCl}^{30°\,C.}$ greater than 2 (dl/g), which assembly corresponds to a molecular weight of about 50,000 or higher.

The polymers of the $A_1$-component can be obtained by the procedure of mixing a polymer having acrylonitrile or methacrylonitrile as a structural unit with ethylenediamine and, if necessary, together with other amines and heating this mixture first at a temperature of 90°–120° C. for 1–5 hours and then, after addition of an amination catalyst, for further 1–5 hours at this temperature.

As the polymer having acrylonitrile or methacrylonitrile as a structural unit, there may be used a homopolymer of acrylonitrile or methacrylonitrile or a copolymer of acrylonitrile or methacrylonitrile in a proportion of more than 50 mole % with another vinyl monomer in a proportion of less than 50 mole %. As the other vinyl monomer, there may be enumerated acrylamide, acrylate esters, vinyl acetate and so on. The polymers having a structural unit of acrylonitrile or methacrylonitrile to be incorporated in the reaction may preferably have a molecular weight greater than 100,000 and especially greater then 1,000,000. These polymers are reacted either ethylenediamine solely to produce polyvinylimidazoline or under the co-existence of another amine for producing polymers having another cationic structural unit beside vinylimidazoline. As the other amine, any of those having primary, secondary and tertiary amino groups can be employed, while those having tertiary amino group are preferred.

As for the amines having a tertiary amino group, there is no special limitation and there may be enumerated, for example, N,N-dimethyl-1,2-ethylenediamine, N,N-dimethyl-1,3-propanediamine, N-(3-aminopropyl)-morpholine, N-(3-aminophenyl) morpholine, N-(3aminopropyl)-piperidine and so on. These amines having a tertiary amino group can be reacted wtih the polymer having acrylonitrile or methacrylonitrile as a structural unit either solely or in mixture with another amine having a primary or secondary amino group.

As the amines having a primary or secondary amino group, for example, N-methylethylenediamine, diethylenetriamine and so on can be used, while ethylenediamine is most preferred.

There is no special limitation for the amination catalyst and it is possible to use, for instance, sulfur, sodium sulfide, thioacetamide, thioglycolic acid and so on each in an amount of about 1–10%, based on the weight of the polymers having acrylonitrile or methacrylonitrile unit.

The final polymers obtained in the manner as mentioned above can be isolated by a usual method such as introducing into acetone, and can be used as such for the cationic flocculant, though it is also possible to use them after they have been subjected to hydrolysis. Thus, the present invention also includes in its technical scope these hydrolyzed products.

These cationic polymers of $A_1$-component may preferably be employed in the form of acid addition salts by adding acid in order to increase the solubility in water. For the acid, inorganic acids, such as hydrochloric acid, sulfuric acid and so on, and organic acids, such as oxalic acid, acetic acid and so on, may be used.

As for the polymers of $A_1$-component, disclosures have been given in U.S. Pat. Nos. 3,288,707, 3,406,139, 3,300,406 and 4,245,250. $A_2$-component: This consists of Hofmann-degradation products of polymers having acrylamide or methacrylamide as a structural unit.

For the polymers having acrylamide or methacrylamide as a structural unit, these polymers may contain structural units other than acrylamide or methacrylamide in a proportion not exceeding 50 mole %.

Examples of such polymers include polyacrylamide, polymethacrylamide and copolymers of acrylamide or methacrylamide with other monomers capable of copolymerizing therewith. As the copolymerizable other monomers, ones such as, acrylonitrile or methacrylonitrile, methyl or ethyl (meth)acrylate and so on, may be employed.

$A_2$-component consists of the Hofmann-degradation products of the polymers as above and should preferably have intrinsic viscosities $[\eta]_{0.1}\text{N-NaCl}^{30°}$ C. not less than 1 (dl/g), corresponding assumably to the molecular weights of about 50,000 and higher, though some deviations may be possible due to the practical measurement method.

The polymers having acrylamide or methacrylamide as a structural unit can be obtained by dissolving the monomer of acrylamide or methacrylamide solely or in a mixture with other monomers capable of copolymerizing therewith in water or in an organic solvent such as methanol and polymerizing by adding a polymerization initiator. As the polymerization initiator, such as for example, hydrogen peroxide, ammonium peroxysulfate, potassium peroxysulfate, benzoyl peroxide, azobisisobutyronitrile and others usually used can be employed solely or in mixture. A redox system using a reducing agent concurrently may be used for the polymerization initiator.

The Hofmann-degradation products of the polymers having as a structural unit acrylamide or methacrylamide can be obtained in such a manner, that an aqueous solution of the polymer is subjected to the reaction with a hypohalogenite such as sodium hypochlorite, sodium hypobromite and calcium hypochlorite in the presence of alkali, such as sodium hydroxide, potassium hydroxide and so on.

The Hofmann-degradation products of these polymers having acrylamide or methacrylamide as a structural unit have been reported by C. L. Arcus: Journal of Polymer Science, 8, 365 (1952) and by M. Mullier and G. Smets: Journal of Polymer Science, 23, 915 (1957).

9B-component: this consists of one or more of the polymers selected from synthetic water-soluble cationic polymers other than the polymers of the A-component and acts as a cationic flocculant.

For the polymers of B-component, known synthetic organic flocculants of cationic nature can be adopted. While there is no special restriction as for the cationic polymers to be used for B-component, it is preferable to use one or more water soluble cationic polymers selected from the group consisting of the following $B_1$- to $B_7$-components.

$B_1$-component: Polymers having aminoalkylacrylate, aminoalkylmethacrylate, acid addition salts thereof or quaternized products thereof as a structural unit $B_2$-component: Mannich-reaction products of polymers having acrylamide or methacrylamide as a structural unit $B_3$-component: Polyamidepolyamine $B_4$-component: Polyethleneimine B$_5$-component: Polymers having dialkyldiallylammonium salt as structural unit B$_6$-component: Polymers having aminoalkylacrylamide, aminoalkylmethacrylamide, acid addition salts thereof or quaterized products thereof as a structural unit B$_7$-component: Polymers having vinylbenzylalkylamine as a structural unit For these cationic polymers, those having larger molecular weights may be preferred. Polymers having instrinsic viscosities $[\eta]_{0.1N\text{-}NaCl}^{30°\text{ C.}}$ not less than 5 (dl/g) are preferable, since the total dosage of the cationic flocculant cannot be much decreased by the use of polymers having intrinsic viscosity lower than this value. The molecular weight corresponding to this viscosity value may be assumed to be 500,000 or more for the polymers of B$_1$-component having structural unit of aminoalkylacrylate or aminoalkylmethacrylate, while there may be some differences for the value for each polymer employed.

Examples of the polymers of B$_1$-component which have a structural unit of aminoalkylacrylate or aminoalkylmethacrylate are homopolymers of dimethylaminoethylmethacrylate, dimethylaminoethylacrylate, tert.-butylaminoethylmethacrylate, tert.-butylaminoethylacrylate, diethylaminoethylmethacrylate and diethylaminoethylacrylate, acid addition salts thereof and quaternized products thereof and copolymers of these monomers with another monomer, such as acrylamide, methacrylamide, dimethylacrylamide, dimethylmethacrylamide, acrylonitrile, methacrylonitrile, vinyl acetate, methyl acrylate, methyl methacrylate, ethyl acrylate, ethyl methacrylate or styrene.

The polymers of B$_1$-component can be produced in such a manner that the monomer such as dimethylaminoethylacrylate or dimethylaminoethylmethacrylate is once converted into acid addition salt such as sulfate or into quaternary ammonium salt using a quaternizing agent such as methyl chloride, benzyl chloride, dimethyl sulfate or so on and is then subjected to polymerization solely or to copolymerization with another monomer such as acrylamide, acrylonitrile, methylacrylate and so on. The polymers of B$_1$-component are superior as the polymers of B-component.

The Mannich-reaction products of the polymers having as a structural unit acrylamide or methacrylamide of B$_2$-component are cationic polymers obtained by subjecting homopolymer of acrylamide or methacrylamide or copolymers of these with other monomers to Mannich-reaction.

In the process according to the present invention, the above described A- and B-components are first added to the sludge to be treated. Here, both components can be added to the sludge in the form of separate aqueous solutions both having a concentration of about 0.1-2% by weight or in the form of a mixed solution. When they are used as separate solutions, these can be added to the sludge simultaneously or separately in a voluntary sequence.

While the dosage of the cationic organic flocculant may vary in accordance with the properties of the sludge to be treated, such as pH value, content of suspended solids (SS), content of volatile suspended solids (VSS), electric conductivity and so on, it may be recommended in general to use dosage of 0.3-6%, based on the weight of SS. A weight proportion of the A-component to the B-component from about 4:1 to about 1:4 may be suitable, since otherwise the synergistic effect may become feeble and economization of the cost of treatment may be difficult to attain. Any optional proportion of the polymers may be adopted for both the A- and B-components, when using two or more of the subcomponents.

After the cationic organic flocculant described as above has been added to the sludge to be treated, a first stage agitation is preformed to effect the first flocculation. The first stage agitation is incorporated in order to cause sufficient reaction of the fluocculant with the sludge, so that such an intensive agitation is preferred therefor, that no floc having a size exceeding 2 mm will be formed. In other words, no flocs will be formed or the flocs, if formed, have diameters not exceeding 2 mm.

There is no special restriction in manner of agitation. Thus, it is possible to incorporate agitation by impeller in a mixing tank, agitation by passing through a conduit system and agitation by passing through a pump such as volute pump, etc.

As a measure of the intensity of agitation, it may be suggested that, in a mixing vessel equipped with a vane stirrer, a peripheral speed of the vane of 1–5 m./sec. is employed for the strong agitation.

In the process according to the present invention, the intensive agitation after the addition of the cationic flocculant makes it possible to attain a thorough reaction over the entire bulk of the sludge to neutralize the electric charge of the sludge, so as to effect formation of flocs having improved dewatering aspect by addition of the second flocculant of anionic nature. In order to achieve the neutralization of the electric charge of the sludge, it is preferable that no flocculation occurs during the high intensity first stage agitation or, even when flocculation occurs, the flocs have no greater size than 2 mm. Therefore, the first stage agitation should be carried out, as suggested above, with higher intensity than that employed ordinarily for attaining flocculation.

After the neutralization of the electric charge of the sludge has been effected as above, the anionic organic flocculant is added thereto and the second stage agitation is performed to cause flocculation of the sludge.

While there is no special restriction as for the anionic organic flocculant, it is preferable to use one or more water-soluble anionic polymers selected from the group consisting of the following C$_1$- to C$_5$-components.

C$_1$-component: This consists of polyacrylic or polymethacrylic acids or salts thereof.

C$_2$-component: This consists of partially hydrolyzed products of polyacrylamide or polymethacrylamide.

C$_3$-component: This consists of copolymers of acrylic or methacrylic acid or salts thereof with acrylamide or methacrylamide.

C$_4$-component: This consists of copolymers of vinylsulfonic acid salt with acrylamide or methacrylamide.

C$_5$-component: This consists of terpolymers of 2-acrylamido-2-methyl-propanesulfonic acid salt with acrylic or methacrylic acid salt and acrylamide or methacrylamide.

The higher the molecular weight of these synthetic water-soluble anionic polymers, the more preferable they will be and, especially, molecular weights of more than 1,000,000 may be recommended.

While the requisite dosage for the anionic organic flocculant may also vary in accordance with the properties of the sludge to be treated, a dosage of about 0.2-3%, based on the weight content of SS, may be pertinent in general. Any chosen proportion of the synthetic polymers in the anionic organic flocculant can be employed, when using two or more polymers simultaneously therefor.

The second stage agitation is performed in order to effect the essential flocculation and hence is carried out at an intensity that may be adopted in an ordinary flocculation treatment of aqueous sludge, which is of course weaker than the first stage agitation. While there is no special limitation as to the means for this agitation, it is possible in the case of using a mixing vessel equipped with a vane stirrer, that a peripheral speed of the vane of 0.1–0.5 m./sec. may be realized. By conducting such agitation, the particles of the sludge which have been subjected to the neutralization of the electric charge by the reaction with the cationic flocculant will come together to form flocs and thereby large and stout flocs are built up, resulting in a better dewaterability of the flocculated sludge.

The flocculated sludge may be supplied as such or after the separation of the supernatant water layer to a dehydrator to effect dewatering in a conventional manner. For this, dehydration by centrifuge, vacuum and squeezing principles may be adopted. For realizing such dehydration techniques, dehydrators of centrifuge, vacuum, belt press, screw press and filter press types which have heretofore been used in practice may be employed.

When using a belt press type dehydrator with filter cloth, it is permissible by the process according to the present invention to achieve a squeezing pressure of more than 1 kg/cm$^2$, as contrasted to the processes of prior art where it has never been realized to attain a squeezing pressure of more than 0.5 kg/cm$^2$ owing to the poor exfoliativity of the retained cake from the filter cloth and to the possible protrusion of the cake from the filter cloth edges. Thus, it is possible to obtain by the process according to the present invention a dewatered cake having a low moisture content depending on squeezing pressure employed.

The thus dewatered cake from the process according to the present invention is then put to disposal by methods such as drying, incineration or composting. Due to the low moisture content, if offers the advantages that the supplementary fuel for the drying and incineration can be economized and that the additives for moisture regulation in the composting, such as sawdust, chaffs, straw and so on, can also be cut down.

In the process according to the present invention, a mixture of the A- and B-components which are different in properties is added as the cationic organic flocculant to the aqueous organic sludge to effect the first stage agitation, so that the neutralization of the electric charge of the sludge can be accomplished in an adequate manner. Therefore, the flocs formed subsequently by the second stage agitation under the addition of the anionic high molecular weight flocculant are large in size and exhibit a low tenacity and a non-sticky dry touch, so that the flocculated sludge is weakly adhesive to the filter cloth and thus exhibits superior filtration and dewatering performances, resulting in an increased capacity of the sludge disposal together with low moisture content of the filtered cake, whereby an efficient and economical sludge treatment will be realized. Due to the wide tolerable range for the proportion of the cationic organic flocculant to the anionic flocculant, and easier regulation of the dosages in the practical operation can be presumed. Moreover, it is possible to attain an efficient performance of the dewatering treatment stable to variation in the sludge properties during the treatment.

The present invention will be described below by several Examples. The flocculants employed in the Examples are summarized in Table 1.

TABLE 1

| Designation | Compound | Intrinsic viscosity $[\eta]^{30°C}_{0.1N-NaCl}$ (dl/g) | Intrinsic viscosity $[\eta]^{30°C}_{0.1N-NaOH}$ (dl/g) | Colloid equivalent (meq./g) |
|---|---|---|---|---|
| A$_1$-I* | Hydrochloric acid salt of the compound of Prod. Example 1 | 2.7 | — | 6.7 (pH 4) |
| A$_1$-II* | Hydrochloric acid salt of the compound of Prod. Example 2 | 2.8 | — | 3.4 (pH 4) |
| A$_2$-I* | Hofmann-degradation product of polyacrylamide | 2.2 | — | 4.4 (pH 4) |
| B$_1$-I* | Homopolymer of dimethylaminoethyl methacrylate quaternized with methyl chloride | 9.8 | — | 4.8 (pH 4) |
| B$_1$-II* | Homopolymer of dimethylaminoethyl methacrylate quarternized with methyl chloride | .8 | — | 4.8 (pH 4) |
| B$_1$-III* | Copolymer of acrylamide with dimethylaminoethyl methacrylate quaternized with methyl chloride | 16.2 | — | 2.6 (pH 4) |
| B$_1$-IV* | Copolymer of acrylamide with dimethylaminoethyl methacrylate quaternized with methyl chloride | 9.4 | — | 2.5 (pH 4) |
| C$_1$-I** | Homopolymer of sodium acrylate | — | 6.7 | −10.6 (pH 10.5) |
| C$_3$-I** | Copolymer of sodium acrylate with acrylamide | — | 8.8 | −7.1 (pH 10.5) |

*Cationic flocculant
**Anionic flocculant

PRODUCTION OF EXAMPLE 1

A liquid mixture of 6.30 g of ethylenediamine with 7.14 g of N,N-dimethyl-1,3-propanediamine was put in a three-neck flask, which is equipped with a stirrer and a pipe for introducing nitrogen gas and which had been set on an oil bath, and therein were dispersed homogeneously 2.65 g of powdered polyacrylonitrile having molecular weight of $1.1 \times 10^6$. Thereto was added a solution of 0.12 g of thioacetamide dissolved in 5.76 g of the same amine mixture and the resulting mixture was heated at 110° C. for 4 hours while introducing nitrogen gas with agitation. The polyacrylonitrile was dissolved almost entirely and a yellowish brown liquid was obtained. After distilling off the unreacted excess amine by vacuum evaporation, 4.5 g of a viscous brown liquid were left. Upon addition of 25 g of water containing dissolved therein 2.0 g of hydrochloric acid to this reaction product, there was obtained a viscous yellowish light-brown liquid. After this liquid had been introduced into a large amount of acetone, about 6.2 g of polyvinylimidazoline were obtained as a solid having yellowish light-brown color.

PRODUCTION EXAMPLE 2

10.0 g of ethylenediamine were placed in a three-neck flask set on an oil bath and equipped with a stirrer and a nitrogen gas inlet pipe and therein were dispersed uniformly 2.65 g of pulverous polyacrylonitrile having a molecular weight of $1.1 \times 10^6$. Thereto was added then 0.12 g of thioacetamide dissolved in 5.0 g of the same amine and the mixture was heated at 110° C. for 4 hours while introducing nitrogen gas with agitation. After the remaining unreacted amine had been removed by distillation under a reduced pressure, 4.8 g of a viscous yellowish light-brown liquid were obtained. By adding 25 g of water containing dissolved 2.0 g of hydrochloric acid to this reaction product, a viscous light-yellow liquid was formed. After this liquid was introduced into a large amount of acetone, about 6.5 g of polyvinylimidazoline chloride were obtained as a solid having light-yellow color.

EXAMPLE 1

200 of an aqueous sludge mixture (pH=5.6, SS=2.13 wt.-%, VSS=68 wt.-% of SS) of primary settled sludge of sewage and an excess activated sludge were treated by subjecting first to a first stage agitation for 30 seconds under the addition of a cationic synthetic flocculant recited in Table 2 by agitating with a stirrer having two flat vanes under varying agitation intensities by altering the rate of rotation and then to a second stage agitation for 20 seconds under the addition of an anionic organic flocculant indicated in Table 2 using the stirrer at a rate of revolution of 250 rpm. The flocs formed were poured into a Buchner funnel covered with a nylon 100-mesh filter cloth and the amount of filtrate after 10 seconds were measured (Nutsche Test). On the other hand, 15 g of the filtered sludge cake were sampled and were placed between two sheets of a filter cloth (polyester, woven in herringbone) in use for a belt-press type dehydrator and squeezed under a pressure of 0.5 kg/cm² for 60 seconds so as thereafter to measure the moisture content of the cake (Press Test). Results are summarized in Table 2.

From Table 2, it is seen that better filtrability with low moisture content can be achieved, when the floc diameter after the first stage agitation does not exceed 2 mm (Test Nos. 1–8). In particular, it is seen that the use of the compounds of Production Examples 1 and 2 for the cationic organic flocculant will bring about better results as compared with the case of using other synthetic flocculants (Test Nos. 1–4). Here, it is recognizable that a concurrent use of said cationic flocculants resulted in superior effects than the cases without use of them concurrently (Test Nos, 5–8). It is also seen that the results were superior for Production Example 1 than for Production Example 2.

EXAMPLE 2

An excess activated sludge (pH=6.8, SS=1.67 wt.-%, VSS=82 wt.-% of SS) from an activated sludge treatment of the waste water of a food manufacturing factory was examined by Nutsche and Press Tests as in Example 1. The results obtained are summarized in Table 3.

From Table 3, it is seen, that better filtrability with low moisture content of the filtered cake can be achieved (Test Nos. 1–5), if the floc diameter after the first stage agitation does not exceed 2 mm. In particular, it is seen that the use of the Hofmann-degradation product of polyacrylamide for the cationic organic flocculant will bring about better results as compared with the case of using other synthetic organic flocculants. It is further recognizable that the concurrent use of said Hofmann-degradation product (Test Nos. 1 and 2) will result in more superior effects than the cases without the concurrent use thereof (Test Nos. 3–5).

TABLE 2

| Test No. | Cationic flocculant and dosage (wt.-%, based on SS) A-component | | B-component | | Anionic flocculant and dosage (wt.-%, based on SS) | | Filtrate accumulated within first 10 sec. (ml) | Moisture content of dewatered cake (wt.-%) | Size of floc after 1st agitation (mm) |
|---|---|---|---|---|---|---|---|---|---|
| 1 | A$_1$-I | 0.6 | B$_1$-III | 0.3 | C$_3$-I | 0.3 | 135 | 74.1 | 1.1 |
| 2 | A$_1$-I | 0.6 | B$_1$-III | 0.3 | C$_3$-I | 0.3 | 132 | 74.3 | 1.9 |
| 3 | A$_1$-II | 0.6 | B$_1$-III | 0.3 | C$_3$-I | 0.3 | 128 | 75.3 | 1.0 |
| 4 | A$_1$-II | 0.6 | B$_1$-III | 0.3 | C$_3$-I | 0.3 | 126 | 75.6 | 1.8 |
| 5 | A$_1$-I | 0.9 | — | — | C$_3$-I | 0.3 | 115 | 75.9 | 1.4 |
| 6 | A$_1$-II | 0.9 | — | — | C$_3$-I | 0.3 | 107 | 76.3 | 1.4 |
| 7 | — | — | B$_1$-III | 0.9 | C$_3$-I | 0.3 | 92 | 76.9 | 1.5 |
| 8 | — | — | B$_1$-IV | 0.9 | C$_3$-I | 0.3 | 89 | 77.0 | 1.4 |
| 9 | A$_1$-I | 0.6 | B$_2$-III | 0.3 | C$_3$-I | 0.3 | 69 | 78.0 | 2.7 |
| 10 | A$_1$-II | 0.6 | B$_1$-III | 0.3 | C$_3$-I | 0.3 | 62 | 78.1 | 2.5 |
| 11 | A$_1$-I | 0.9 | — | — | C$_3$-I | 0.3 | 58 | 78.3 | 3.0 |
| 12 | A$_1$-II | 0.9 | — | — | C$_3$-I | 0.3 | 54 | 78.6 | 2.8 |
| 13 | — | — | B$_1$-III | 0.9 | C$_3$-I | 0.3 | 50 | 80.3 | 2.6 |
| 14 | — | — | B$_1$-IV | 0.9 | C$_3$-I | 0.3 | 48 | 81.0 | 2.5 |

TABLE 3

| Test No. | Cationic flocculant and dosage (wt.-%, based on SS) | | | | Anionic flocculant and dosage (wt.-%, based on SS) | | Filtrate accumulated with in first 10 sec. (ml) | Moisture content of dewatered cake (wt.-%) | Size of floc after 1st agitation (mm) |
|---|---|---|---|---|---|---|---|---|---|
| | A-component | | B-component | | | | | | |
| 1 | A$_2$-I | 1.0 | B$_1$-I | 0.4 | C$_1$-I | 0.6 | 147 | 77.7 | 0.9 |
| 2 | A$_2$-I | 1.0 | B$_1$-I | 0.4 | C$_1$-I | 0.6 | 141 | 77.9 | 1.8 |
| 3 | A$_2$-I | 1.4 | — | — | C$_1$-I | 0.6 | 111 | 80.4 | 1.6 |
| 4 | — | — | B$_1$-I | 1.4 | C$_1$-I | 0.6 | 98 | 81.5 | 1.7 |
| 5 | — | — | B$_1$-II | 1.4 | C$_1$-I | 0.6 | 96 | 81.1 | 1.6 |
| 6 | A$_2$-I | 1.0 | B$_1$-I | 0.4 | C$_1$-I | 0.6 | 67 | 82.5 | 2.4 |
| 7 | A$_2$-I | 1.0 | B$_1$-I | 0.4 | C$_1$-I | 0.6 | 66 | 82.7 | 3.1 |
| 8 | A$_2$-I | 1.4 | — | — | C$_1$-I | 0.6 | 63 | 83.1 | 2.5 |
| 9 | — | — | B$_1$-I | 1.4 | C$_1$-I | 0.6 | 58 | 83.7 | 2.7 |
| 10 | — | — | B$_1$-II | 1.4 | C$_1$-I | 0.6 | 49 | 84.1 | 2.6 |

We claim:

1. A process for dewatering an aqueous organic sludge consisting essentially of water and suspended solid particles, which comprises the steps of:

in a first stage, adding to said sludge an amount in the range of 0.3 to 6 wt. %, based on the weight of suspended solids in said sludge, of a synthetic, water-soluble cationic organic flocculant which consists of an A-component and a B-component, wherein said A-component consists of one or more polymers selected from the group consisting of an A$_1$-component and an A$_2$-component, said A$_1$-component being selected from polymers consisting essentially of structural units of vinylimidazoline or partially hydrolyzed products thereof, which A$_1$-component polymers have intrinsic viscosities $[\eta]_{0.1\text{N-NaCl}}^{30°\text{ C.}}$ of at least 2 dl/g, and said A$_2$-component being selected from Hofmann degradation products of polymers consisting essentially of structural units of acrylamide or methacrylamide, which A$_2$-component polymers have intrinsic viscosities $[\eta]_{0.1\text{N-NaCl}}^{30°\text{ C.}}$ of at least 1 dl/g, and said B-component consists of one or more polymer components selected from the group consisting of (B$_1$) polymers consisting essentially of structural units of aminoalkylacrylate, aminoalkylmethacrylate, acid addition salts thereof or quaternized products thereof, (B$_2$) Mannich-reaction products of polymers consisting essentially of structural units of acrylamide or methacrylamide, (B$_3$) polyamide-polyamine, (B$_4$) polyethyleneimine, (B$_5$) polymers consisting essentially of structural units of dialkyldiallylammonium salt, (B$_6$) polymers consisting essentially of structural units of aminoalkylacrylamide, aminoalkylmethacrylamide, acid addition salts thereof, or quaternized products thereof, and (B$_7$) polymers consisting essentially of structural units of vinylbenzylalkylamine, which B-component polymers have intrinsic viscosities $[\eta]_{0.1\text{N-NaCl}}^{30°\text{ C.}}$ of at least 5 dl/g, wherein the proportion by weight of said A-component to said B-component is in range of 4:1 to 1:4, and simultaneously intensely agitating said sludge under conditions effective to neutralize ionic charges of said suspended solid particles and prevent formation of flocs having an average size larger than 2 mm in said sludge;

then, without removing water from said sludge, in a second stage, adding to said neutralized sludge obtained from said first stage 0.2 to 3 wt. %, based on the weight of suspended solids in said neutralized sludge, of a synthetic, water-soluble anionic organic flocculant consisting essentially of polymers having molecular weights of at least 1,000,000, and selected from the group consisting of the following C$_1$ to C$_5$ components:

C$_1$ component: Polyacrylic or polymethacrylic acid or salts thereof,

C$_2$ component: Partially hydrolyzed products of polyacrylamide or polymethacrylamide C$_3$ component: Copolymers of acrylic acid, methacrylic acid or salts thereof with acrylamide or methacrylamide, C$_4$ component: Copolymers of vinylsulfonic acid salts with acrylamide or methacrylamide, C$_5$ component: Terpolymers of 2-acrylamido -2methylpropanesulfonic acid salt with acrylic or methacrylic acid salt and acrylamide or methacrylamide, and simultaneously agitating said sludge under milder mixing conditions than those used in said first stage effective to flocculate said sludge to form flocs having a larger floc size than the flocs formed in said first stage, which flocs are nonsticky to the touch; and then dewatering the flocculated sludge obtained from said second stage.

2. A process according to claim 1, wherein said A$_1$ component consists of one or more polymers selected from the group consisting of polyvinylimidazoline and copolymers of vinylimidazoline with vinylpyrimidine and/or other monomers, or partially hydrolyzed products of said polymers.

3. A process according to claim 1, wherein said A$_2$ component consists of one or more Hofmann-degradation products of the polymers selected from the group consisting of polyacrylamide, polymethacrylamide and copolymers of acrylamide or methacrylamide with acrylonitrile, methacrylonitrile, methyl acrylate, ethyl acrylate, methyl methacrylate or ethyl methacrylate.

4. A process as claimed in claim 3, wherein said A$_1$-component consists of structural units of vinylimidazoline and not more than 50 mole % of structural units of at least one of vinylpyrimidine, acrylamide, acrylate ester and vinyl acetate.

5. A process according to claim 1, wherein said B-component consists of component B$_1$, and said component B$_1$ consists of one or more polymers selected from the group consisting of homopolymers of dimethylaminoethylmethacrylate, dimethylaminoethylacrylate, tertiary-butylaminoethylmethacrylate, tertiary-butylaminoethylacrylate, diethylaminoethylmethacrylate, diethylaminoethylacrylate, acid addition salts thereof or quaternized products thereof; or copolymers of the monomers mentioned above with acrylamide, methacrylamide, dimethylacrylamide, dimethylmethacrylamide, acrylonitrile, methacrylonitrile, vinyl acetate, methyl acrylate, methyl methacrylate, ethyl acrylate, ethyl methacrylate or styrene.

6. A process as claimed in claim 1, wherein said component A consists of a hydrochloric acid salt of polyvinylimidazoline or Hofmann-degradation product of polyacrylamide, said component B consists of a homopolymer of dimethylaminoethylmethacrylate quaternized with methyl chloride or a copolymer of acrylamide with dimethylaminoethyl methacrylate quaternized with methyl chloride, and said synthetic anionic flocculant consists of a sodium acrylate homopolymer or a copolymer of sodium acrylate with acrylamide.

* * * * *